US006948325B1

(12) United States Patent
Axe et al.

(10) Patent No.: US 6,948,325 B1
(45) Date of Patent: Sep. 27, 2005

(54) AIR CONDITIONING SYSTEM AND METHOD OF TESTING

(75) Inventors: Richard James Axe, Somerset (GB); Richard Grant Hunt, Somerset (GB)

(73) Assignee: Honeywell Normalair-Garrett (Holdings) Limited, Yeovil (GB)

( * ) Notice: Subject to any disclaimer, the term of this patent is extended or adjusted under 35 U.S.C. 154(b) by 0 days.

(21) Appl. No.: 10/842,395

(22) Filed: May 10, 2004

(51) Int. Cl.$^7$ .................................................. F25B 9/00
(52) U.S. Cl. ........................ 62/87; 62/127; 62/172; 62/402; 62/DIG. 5
(58) Field of Search ............................... 62/86, 87, 88, 62/126, 127, 129, 172, 401, 402, 403, DIG. 5

(56) References Cited

U.S. PATENT DOCUMENTS

| | | | | |
|---|---|---|---|---|
| 4,445,342 A | * | 5/1984 | Warner .......................... | 62/172 |
| 5,461,882 A | * | 10/1995 | Zywiak ........................ | 62/401 |
| 5,704,218 A | | 1/1998 | Christians et al. ............. | 62/172 |
| 6,148,622 A | * | 11/2000 | Sanger .......................... | 62/88 |
| 6,189,324 B1 | * | 2/2001 | Williams et al. ............... | 62/172 |
| 6,257,003 B1 | * | 7/2001 | Hipsky .......................... | 62/88 |
| 6,415,621 B2 | * | 7/2002 | Buchholz et al. .............. | 62/402 |

FOREIGN PATENT DOCUMENTS

WO     WO 99/41145     8/1999

* cited by examiner

*Primary Examiner*—Harry B. Tanner
(74) *Attorney, Agent, or Firm*—MacMillan, Sobanski & Todd, LLC

(57) ABSTRACT

An air conditioning system for conditioning a supply of hot pressurised air for use in an environment the system including a primary heat exchanger in which heat in the hot pressurised air supply is exchanged with a cooling fluid, a compressor to compress the supply of pressurised air cooled in the primary heat exchanger, a secondary heat exchanger in which heat in the compressed air supply is exchanged with a cooling fluid, and an expansion device for expanding and cooling the compressed air supply cooled in the secondary heat exchanger, mixing apparatus for mixing the expanded and cold supply air with recirculating air from the environment, a by-pass flow path for compressed cooled supply air from the secondary heat exchanger to the environment, and a secondary supply flow path for the hot pressurised air to the secondary heat exchanger, a first valve in a primary supply flow path to the primary heat exchanger, a second valve in the secondary supply flow path to the secondary heat exchanger, a third valve in a flow path for the compressed air supply to the secondary heat exchanger, a fourth valve in the flow path for cooled compressed supply air from the secondary heat exchanger, and a by-pass valve in the by-pass flow path for compressed cooled supply air from the secondary heat exchanger, a first air flow sensor for sensing air flow from the supply to the primary heat exchanger when the first valve is open, a second air flow sensor for sensing air flow from the secondary heat exchanger along the by-pass flow path when the by-pass valve is open, and a third air flow sensor for sensing air flow of the expanded and cold supply air towards the mixing apparatus, and a controller for controlling each of the valves and for receiving inputs from each of the air flow sensors.

6 Claims, 4 Drawing Sheets

AIR CONDITIONING SYSTEM AND METHOD OF TESTING

BACKGROUND TO THE INVENTION

This invention relates, to an air conditioning system, and to a method of testing the integrity of component parts of an air conditioning system.

The invention has particularly but not exclusively been developed for an air conditioning system for an aircraft although the invention may be utilised for other applications.

DESCRIPTION OF THE PRIOR ART

Air conditioning systems for aircraft are known in which a supply of hot pressurised air is bled from a gas turbine engine. This supply is then conditioned and provided to an environment such as an aircraft cabin, although the conditioned air may alternatively or additionally be used for cooling aircraft equipment.

In one arrangement, the hot pressurised air is cooled in a primary heat exchanger by cooler ambient air before being compressed, and thus heated again. The compressed and hot air is again cooled, in a secondary heat exchanger, again by cooler ambient air, before being expanded by an expansion device, and cooled. The expanded and cold air is then mixed in a mixing apparatus with air which is recirculated from the cabin, and the mixture is introduced into the cabin environment. In a modification, the hot cabin air during its recirculation, and before mixing with the cold and expanded air, is used to improve the efficiency of the expansion device, by exchanging heat from the cabin air with the cooled and compressed supply air prior to its expansion. Such a system is the subject of our published application number EP-A-1418123.

It will be appreciated that such systems are complex and it is important that the integrity of the system, or at least of component parts thereof, can simply be tested, in flight even, and any leakage of air from component parts of the system identified.

SUMMARY OF THE INVENTION

According to a first aspect of the invention we provide an air conditioning system for conditioning a supply of hot pressurised air for use in an environment, the system including a primary heat exchanger in which heat in the hot pressurised air supply is exchanged with a cooling fluid, a compressor to compress the supply of pressurised air cooled in the primary heat exchanger, a secondary heat exchanger in which heat in the compressed air supply is exchanged with a cooling fluid, and an expansion device for expanding and cooling the compressed air supply cooled in the secondary heat exchanger, mixing apparatus for mixing the expanded and cold supply air with recirculating air from the environment, a by-pass flow path for compressed cooled supply air from the secondary heat exchanger to the environment, and a secondary supply flow path for the hot pressurised air to the secondary heat exchanger, a first valve in a primary supply flow path to the primary heat exchanger, a second valve in the secondary supply flow path to the secondary heat exchanger, a third valve in a flow path for the compressed air supply to the secondary heat exchanger, a fourth valve in the flow path for cooled compressed supply air from the secondary heat exchanger, and a by-pass valve in the by-pass flow path for compressed cooled supply air from the secondary heat exchanger, a first air flow sensor for sensing air flow from the supply to the primary heat exchanger when the first valve is open, a second air flow sensor for sensing air flow from the secondary heat exchanger along the by-pass flow path when the by-pass valve is open, and a third air flow sensor for sensing air flow of the expanded and cold supply air towards the mixing apparatus, and a controller for controlling each of the valves and for receiving inputs from each of the flow sensors.

In the system of the invention, the controller may monitor the proper operation of the system in normal operation from the inputs from the flow sensors. Moreover by opening and closing the valves appropriately, component parts of the system may be isolated from air flow therethrough, so that the integrity of those component parts may be tested.

The system of the invention may include a load heat exchanger in which heat in hot air from the recirculating environment air is exchanged to the cooled compressed air from the secondary heat exchanger before passing to the expansion device.

According to a second aspect of the invention we provide a method of testing the integrity of the secondary heat exchanger of the system of the first aspect of the invention, the method including opening the first valve, and closing each of the second, third, fourth and by-pass valves, and opening a flow path for compressed supply air to the expansion device without the compressed supply air passing through the secondary heat exchanger, and sensing the air flow to the mixing apparatus by the third air flow sensor.

Thus in the event that in normal operation a reduced air flow is sensed by the third air flow sensor, by performing the method of the second aspect of the invention, where a normal air flow is sensed by the third air flow sensor, this would indicate that there is a leakage from the secondary heat exchanger (by which term we include associated ductwork and the like as far as the second, third and fourth, and by-pass valves).

According to a third aspect of the invention we provide a method of testing the integrity of component parts of the system of the first aspect of the invention, the component parts including the primary heat exchanger, the method including closing the first, third and fourth valves, opening the second valve and the by-pass valve, and sensing the air flow to the environment along the by-pass passage by the second air flow sensor.

Thus in the event that in normal operation a reduced air flow is sensed by the third air flow sensor, by performing the method of the third aspect of the invention, where a normal air flow is sensed by the second air flow sensor, this would indicate that there is a leakage from the component parts of the system being tested which include the primary heat exchanger (by which term we include associated ductwork and the like as far as the first, third and fourth valves and to the third air flow sensor).

According to a fourth aspect of the invention we provide a method of testing the integrity of a load heat exchanger in a system of the first aspect of the invention, in which load heat exchanger heat in hot air from the recirculating environment air is exchanged to the cooled compressed air from the secondary heat exchanger before passing to the expansion device, the method including opening the first, third and by-pass valves, and closing each of the second and fourth valves, and sensing the air flow to the environment along the by-pass passage by the second air flow sensor.

Thus in the event that in normal operation a reduced air flow is sensed by the third air flow sensor, by performing the method of the fourth aspect of the invention, where a normal air flow is sensed by the second air flow sensor, this would indicate that there is a leakage from the load heat exchanger (by which term we include associated ductwork and the like as far as the fourth valve and to the third air flow sensor).

BRIEF DESCRIPTION OF THE DRAWINGS

Embodiments of the invention will now be described with reference to the accompanying drawings in which:—

DESCRIPTION OF THE PREFERRED EMBODIMENTS

Figure 1:
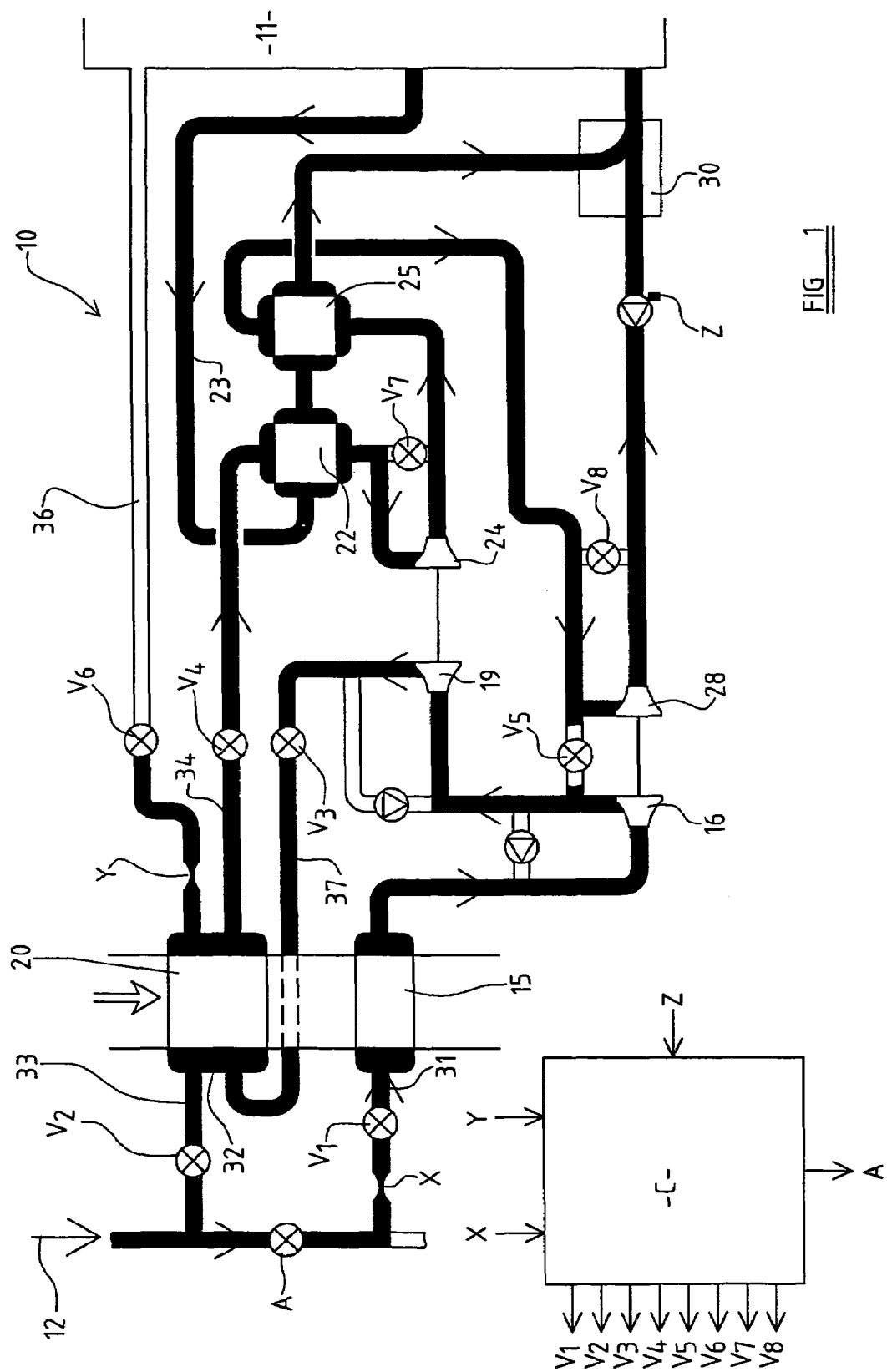
FIG. 1 is an illustrative view of an air conditioning system in accordance with the invention, in normal operation.

Referring first to FIG. 1 an air conditioning system 10 is shown for conditioning hot pressurised air from an air supply 12, for use in an environment 11 which in this case is an aircraft cabin for aircrew and/or passengers. In another example the environment may be part of an apparatus for cooling e.g. aircraft equipment or the like.

The hot pressurised air typically is obtained by bleeding off from a gas turbine engine in which the air is pressurised e.g. by a master flow valve indicated in the figures at A.

In normal operation of the system 10, the hot pressurised supply air 12 is cooled by ambient air in a primary heat exchanger 15. The primary heat exchanger 15 receives so called "ram" air which is forced to flow through the primary heat exchanger 15 due to the aircraft's movement through the air, or on the ground, by a fan (not shown).

The cooled pressurised air then passes to a first compressor 16 where the pressurised air is further compressed and heated, before passing to a second compressor 19, where the supply air is yet further compressed and heated.

The compressed and hot supply air is next passed through a secondary heat exchanger 20 where again heat is exchanged to cooler ambient ram air. Thus the compressed air is cooled.

In normal operation of the system 10, this cooled compressed air from the secondary heat exchanger 20 passes to a first stage 22 of a load heat exchanger, before passing to a first expansion device 24. In the first stage 22 of the load heat exchanger 22, the cooled compressed air gains heat from hot, low pressure, recirculating air from the cabin 13, which is provided to the first stage load heat exchanger 22 via a recirculation loop indicated at 23. Thus the cooled compressed air from the secondary heat exchanger 20 is heated, thus improving the efficiency of the first expansion device 24 which expands and cools the heated compressed air. The expanded and cooled air passes though a second stage load heat exchanger 25 where the expanded and cooled air from the first expansion device 24 is again heated by the hot recirculating cabin air, before passing top a second expansion device 28 where the air is expanded to low pressure, and substantially cooled.

This cold low pressure air then passes to a mixing apparatus 30, where the cold low pressure air is mixed with the cooled recirculating cabin air before being provided to the cabin 11. The cabin 11 may have an exhaust device (not shown) to allow for some cabin air to exhaust to ambient, so that the pressure of the air in the cabin is not increased beyond a threshold due to the introduction of the cold air into the system 10.

The system of the invention further includes the following, namely a first valve V1 which when closed, prevents the flow of hot pressurised bleed air to the primary heat exchanger 15 along a primary bleed air flow path 31, and a second valve V2 which when open, permits hot pressurised bleed air to flow direct to the secondary heat exchanger 20 along a secondary bleed air flow path 33. The secondary heat exchanger 20 includes an inlet manifold 32 in this example so that either compressed air from the second compressor 19 or hot pressurised bleed air may flow through the secondary heat exchanger 22, but never both as the first and second valves V1 and V2 are always arranged to operate in tandem so that one or other of the first and second valves V1 and V2 is always closed.

As well as a duct 34 which leads from the secondary heat exchanger 20 to the first stage load heat exchanger 22, from an outlet manifold 34 of the secondary heat exchanger 20, there is a by-pass passage 36 which extends to the cabin 11 and communicates with the cabin 11 when a by-pass valve V6 in the by-pass passage 36 is open.

In a duct 37 from the second compressor 19 to the secondary heat exchanger 20, there is a third valve V3, and in a duct from the secondary heat exchanger 20 to the first stage load heat exchanger 22, there is a fourth valve V4. A fifth valve V5 is provided in a by-pass 38 which when the fifth valve V5 is open, allows air from the first compressor 16 to flow directly to the second expansion device 28 without passing through the secondary heat exchanger 20, or indeed the second compressor 19, or the load heat exchanger 22, 25 or first expansion device 24.

The system 10 also includes three flow sensors which sense air flow. A first air flow sensor is indicated at X and is provided between the hot pressurised air supply 12 and the first valve V1 to determine that a supply of hot pressurised air is available to the system 10. A second air flow sensor Y is provided between the outlet manifold 34 of the secondary heat exchanger 20 and the by-pass valve V6 to sense air flow long the by-pass passage 36 when the by-pass valve V6 is open, and the third air flow sensor Z, which is a combined component with a check valve in this example, and is provided to sense the flow of cold expanded air to the mixing apparatus 30. In normal use, the third air flow sensor Z will sense a flow of the cold expanded air to the mixing apparatus 30, and will indicate a fault if no, or insufficient air flow is sensed.

Each of the valves V1 to V6, and the three air flow sensors X, Y and Z are connected to a controller which is indicated diagrammatically at C, and in normal operation the controller C closes the second, fifth and sixth valves V2, V5 and V6, and opens the first, third and fourth valves V1, V3 and V6. Thus the air flow through the system 10 from the supply 12 to the mixing apparatus 30 is as described above.

In the event that the third air flow sensor Z senses that there is no or an insufficient flow of cold expanded air to the mixing apparatus 30, this would indicate a leakage from the system 10, provided that the first sensor X still senses a flow of supply air into the system 10. For example, the controller C may determine if there is any leakage by comparing the flow sensed by the first air flow sensor X to the flow sensed by the third air flow sensor Z. Where there is a discrepancy beyond a threshold limit, for example if the third air flow sensor Z senses an air flow of less than say, 70% of the air flow sensed by the first air flow sensor X, the controller C may initiate at least the three tests in the example described in an effort to determine the location of such leakage.

Figure 2:
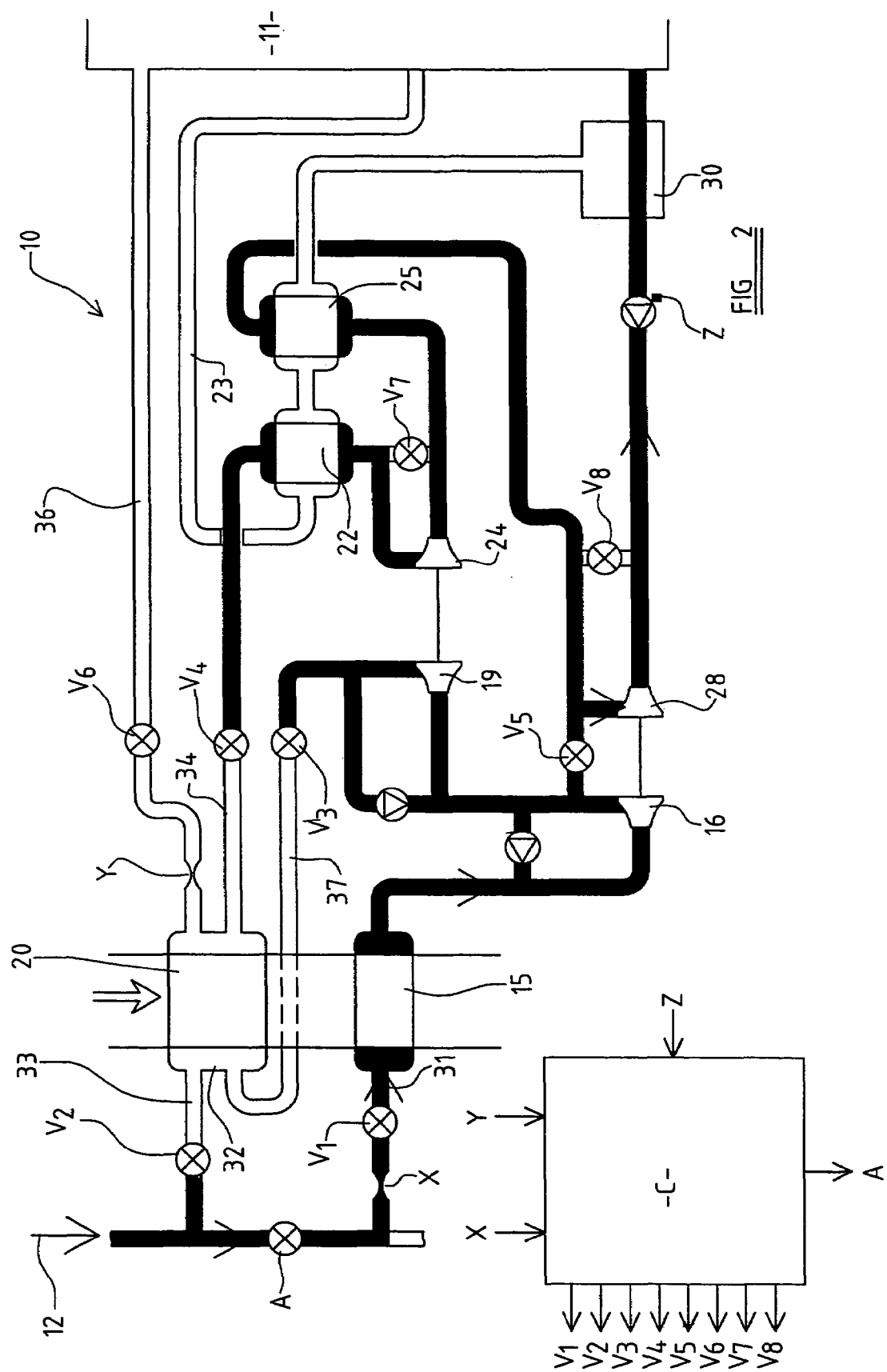
FIG. 2 is a view of the system of FIG. 1 during a test in accordance with the second aspect of the invention.

In the first test, the integrity of the secondary heat exchanger 20 is tested. The configuration of the system 10 during this test is indicated in FIG. 2.

The controller C isolates the secondary heat exchanger 20 by closing the third and fourth valves V3 and V4, whilst maintaining the second valve V2 and the by-pass valve V6 closed. The fifth valve V5 is opened to allow the flow of air from the first compressor 16 to the second expansion device 28 and hence to the mixing apparatus 30, without passing through the secondary heat exchanger 20.

If the third air flow sensor Z then senses a normal flow of air to the mixing apparatus 30, this would indicate that any leakage of the system 10 is occurring in the second heat exchanger 20, or any associated ductwork up to the third and fourth valves V3 and V4.

If the third air flow sensor Z still senses no or an insufficient air flow to the mixing apparatus 30, the controller C performs the second test, as the first test would have indicated that any leakage from the system 10 is not occurring at the secondary heat exchanger 20.

Figure 3:
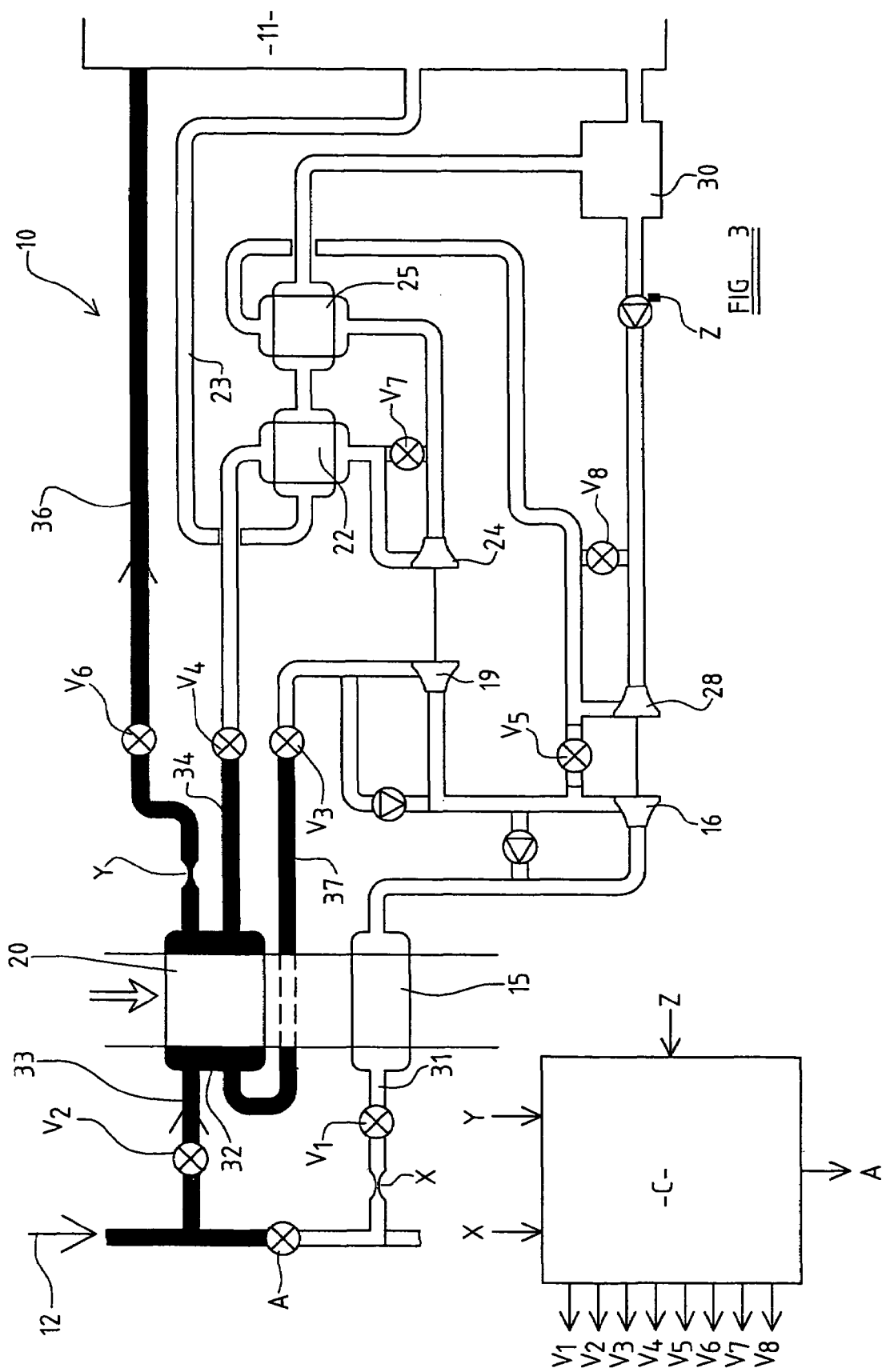
FIG. 3 is a view of the system of FIG. 1 during a test in accordance with the third aspect of the invention.

For the second test, the integrity of the primary heat exchanger 15 and the load heat exchanger 22, 25 are tested by the controller C closing the first and fifth valves V1 and V5, and maintaining closed the third and fourth valves V3, V4 and opening the second valve V2 and the by-pass valve V6. The configuration of the system 10 during this test is indicated in FIG. 3. In this example, where there is a master flow valve A, this is closed by the controller C to prevent any air flow from the supply 12 to the first air flow sensor X, although the first valve V1 prevents supply air 12 flowing to or from the primary heat exchanger 15.

Thus pressurised air from the supply 12 may flow into the secondary heat exchanger 20 without passing through the primary heat exchanger 15 or either of the compressors 16, 19, or the stages of the load heat exchanger 22, 25. The hot pressurised air will still be cooled by ambient air in the secondary heat exchanger 20, but will then pass direct to the cabin 13 along the by-pass passage 36. It will be appreciated that the second valve V2 may only permit a restricted amount of the hot pressurised air to pass.

If the second air flow sensor Y senses an appropriate flow of air along the by-pass passage 36, this would indicate that any leakage of the system was occurring either in the primary heat exchanger 15 and associated ductwork as far as the third and fourth valves V3, V4, or in this example, where a load heat exchanger 22, 25 is provided, that any leakage may be occurring in those component parts. In this case a third test may be performed to determine whether such leakage is occurring in the primary heat exchanger 15 or load heat exchanger 22, 25.

Figure 4:
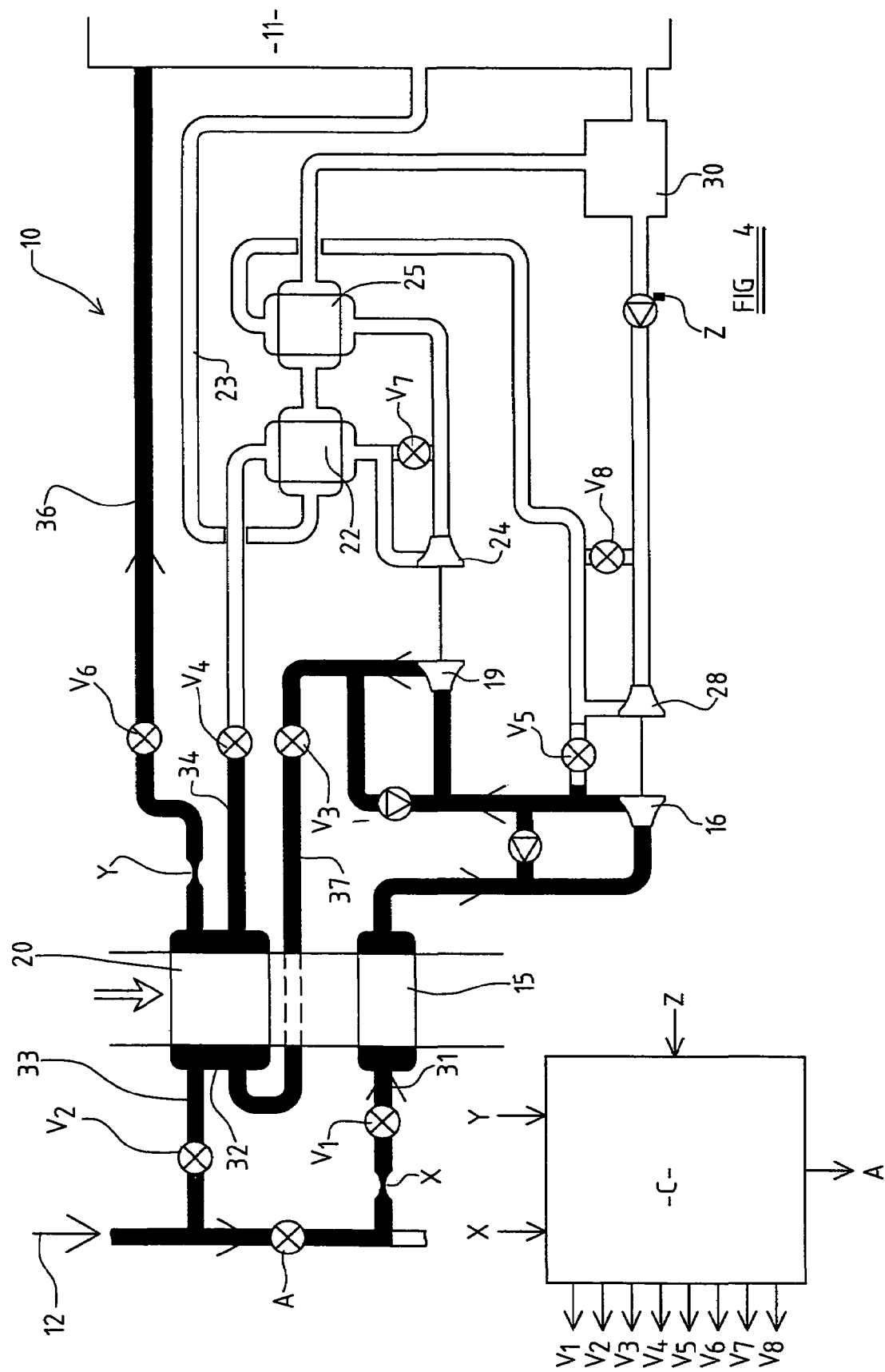
FIG. 4 is a view of the system of FIG. 1 during a test in accordance with the fourth aspect of the invention.

For the third test, the first valve V1 and third valve V3 are again opened, whilst the by-pass valve V6 is maintained open, and the second valve V2 is closed, and the fifth valve V5 is maintained closed. The configuration of the system 10 during this test I indicated in FIG. 4.

In this system 10 configuration, the supply air flows through both the primary 15 and secondary 20 heat exchangers, but cooled compressed air from the secondary heat exchanger 20 cannot pass the fourth valve V4 and flow to the load heat exchanger 22, 25, but rather passes from the secondary heat exchanger 20 via the by-pass passage 36 to the cabin 11. If the second air flow sensor Y senses an appropriate air flow along the by-pass passage 36, this would indicate that any leakage form the system 10 is not from the primary heat exchanger 15, but rather is from the load heat exchanger 22, 26 or associated ductwork, or from the first or second expansion devices 24, 28.

The three tests may be performed in a different order to that described. For example the third described test may be performed first, and if the test indicates that any leakage or air from the system 10 is not from the load heat exchanger 22, 25 and other component parts, the second described test may be performed to determine if such leakage is thus from the primary heat exchanger 15. The first described test may be performed first or last or second, as desired.

The system 10 may thus be tested to identify component parts from which a leakage of air may be occurring, and may be performed in flight, or on the ground as part of a maintenance routine. Because whilst performing the tests, air of an inappropriate temperature, and pressure, may be supplied to the cabin 11 the duration of the tests may be short.

Where in use, for example in flight, there is detected a fault, the controller C may simply indicate this to the crew, and/or may operate the valves V1 to V6, and indeed other valves indicated at V7 and V8 to achieve the maximum flow of the coolest air to the cabin 11 according to a control algorithm, whilst isolating component parts of the system 10 where an air leakage has been determined to be occurring.

During the duration of each of the first and third described tests, the first air flow sensor X must indicate to the controller that supply air 12 is flowing into the system 12, for the tests to be meaningful. Whereas during the second described the first air flow sensor X will not sense air flowing into the system 10, the possibility of this being the reason why air flow to the mixing apparatus 30 has not been detected by the third sensor Z will already have been determined.

In another example, the system 10 may not include the load heat exchanger 22, 25, in which case the second described test will give an indication of the integrity of the primary heat exchanger 15 alone. Further alternatively only a single stage load heat exchanger 22, 25 may be provided.

In the example described, two stage compression of the supply air is obtained by providing two compressors 16, 19 but in another example a single stage compressor may be used. Also instead of two expansion devices 24, 28 a single device may be used.

Conveniently and for maximum efficiency, where two compressors and two expansion devices provided, the first compressor 16 and second expansion device 28 are provided on a common shaft, and the second compressor 19 and first expansion device 24 are provided on a common shaft so that the expansion devices 24, 28 help to drive the compressors 19, 16 respectively.

Where the invention is applied to other than an aircraft, an alternative coolant to ram air may be used as a coolant in the primary and secondary heat exchangers 15, 20, and the supply of hot pressurised air may be derived alternatively to from a gas turbine engine.

In the examples described, the first and second flow sensors X and Y at least may be Venturi or hot wire air flow sensors, and the third air flow sensor Z which is in combination with the check valve, may be of a magnetic of flow contacting kind. These are given as examples as any suitable kind of air flow sensor may be provided. It may be desirable for the third air flow sensor Z to be distinct from the check valve with which it is shown in the figures. For example a third air flow sensor like the first and second sensors X, Y may be provided elsewhere along a duct from the (second) expansion device 28 and the mixing apparatus 30, preferably upstream of the check valve.

What is claimed is:

1. An air conditioning system for conditioning a supply of hot pressurised air for use in an environment, the system including a primary heat exchanger in which heat in the hot pressurised air supply is exchanged with a cooling fluid, a compressor to compress the supply of pressurised air cooled in the primary heat exchanger, a secondary heat exchanger in which heat in the compressed air supply is exchanged with a cooling fluid, and an expansion device for expanding and cooling the compressed air supply cooled in the secondary heat exchanger, mixing apparatus for mixing the expanded and cold supply air with recirculating air from the environment, a by-pass flow path for compressed cooled supply air from the secondary heat exchanger to the environment, and a secondary supply flow path for the hot pressurised air to the secondary heat exchanger, a first valve in a primary supply flow path to the primary heat exchanger, a second valve in the secondary supply flow path to the secondary heat exchanger, a third valve in a flow path for the compressed air supply to the secondary heat exchanger, a fourth valve in the flow path for cooled compressed supply air from the secondary heat exchanger, and a by-pass valve in the by-pass flow path for compressed cooled supply air from the secondary heat exchanger, a first air flow sensor for sensing air flow from the supply to the primary heat exchanger when the first valve is open, a second air flow sensor for sensing air flow from the secondary heat exchanger along the by-pass flow path when the by-pass valve is open, and a third air flow sensor for sensing air flow of the expanded and cold supply air towards the mixing apparatus, and a controller for controlling each of the valves and for receiving inputs from each of the flow sensors.

2. A system according to claim 1 wherein the controller monitors the proper operation of the system in normal operation from the inputs from the flow sensors.

3. A system according to claim 1 wherein there is provided a load heat exchanger in which heat in hot air from the recirculating environment air is exchanged to the cooled compressed air from the secondary heat exchanger before passing to the expansion device.

4. A method of testing the integrity of the secondary heat exchanger of an air conditioning system for conditioning a supply of hot pressurised air for use in an environment, the system including a primary heat exchanger in which heat in the hot pressurised air supply is exchanged with a cooling fluid, a compressor to compress the supply of pressurised air cooled in the primary heat exchanger, a secondary heat exchanger in which heat in the compressed air supply is exchanged with a cooling fluid, and an expansion device for expanding and cooling the compressed air supply cooled in the secondary heat exchanger, mixing apparatus for mixing the expanded and cold supply air with recirculating air from the environment, a by-pass flow path for compressed cooled supply air from the secondary heat exchanger to the environment, and a secondary supply flow path for the hot pressurised air to the secondary heat exchanger, a first valve in a primary supply flow path to the primary heat exchanger, a second valve in the secondary supply flow path to the secondary heat exchanger, a third valve in a flow path for the compressed air supply to the secondary heat exchanger, a fourth valve in the flow path for cooled compressed supply air from the secondary heat exchanger, and a by-pass valve in the by-pass flow path for compressed cooled supply air from the secondary heat exchanger, a first air flow sensor for sensing air flow from the supply to the primary heat exchanger when the first valve is open, a second air flow sensor for sensing air flow from the secondary heat exchanger along the by-pass flow path when the by-pass valve is open, and a third air flow sensor for sensing air flow of the expanded and cold supply air towards the mixing apparatus, and a controller for controlling each of the valves and for receiving inputs from each of the flow sensor, the method including opening the first valve, and closing each of the second, third, fourth and by-pass valves, and opening a flow path for compressed supply air to the expansion device without the compressed supply air passing through the secondary heat exchanger, and sensing the air flow to the mixing apparatus by the third air flow sensor.

5. A method of testing the integrity of component parts of an air conditioning system for conditioning a supply of hot pressurised air for use in an environment, the system including a primary heat exchanger in which heat in the hot pressurised air supply is exchanged with a cooling fluid, a compressor to compress the supply of pressurised air cooled in the primary heat exchanger, a secondary heat exchanger in which heat in the compressed air supply is exchanged with a cooling fluid, and an expansion device for expanding and cooling the compressed air supply cooled in the secondary heat exchanger, mixing apparatus for mixing the expanded and cold supply air with recirculating air from the environment, a by-pass flow path for compressed cooled supply air from the secondary heat exchanger to the environment, and a secondary supply flow path for the hot pressurised air to the secondary heat exchanger, a first valve in a primary supply flow path to the primary heat exchanger, a second valve in the secondary supply flow path to the secondary heat exchanger, a third valve in a flow path for the compressed air supply to the secondary heat exchanger, a fourth valve in the flow path for cooled compressed supply air from the secondary heat exchanger, and a by-pass valve in the by-pass flow path for compressed cooled supply air from the secondary heat exchanger, a first air flow sensor for sensing air flow from the supply to the primary heat exchanger when the first valve is open, a second air flow sensor for sensing air flow from the secondary heat exchanger along the by-pass flow path when the by-pass valve is open, and a third air flow sensor for sensing air flow of the expanded and cold supply air towards the mixing apparatus, and a controller for controlling each of the valves and for receiving inputs from each of the flow sensors, the method including closing the first, third and fourth valves, opening the second valve and the by-pass valve, and sensing the air flow to the environment along the by-pass passage by the second air flow sensor.

6. A method of testing the integrity of a load heat exchanger of an air conditioning system for conditioning a supply of hot pressurised air for use in an environment, the system including a primary heat exchanger in which heat in the hot pressurised air supply is exchanged with a cooling fluid, a compressor to compress the supply of pressurised air cooled in the primary heat exchanger, a secondary heat exchanger in which heat in the compressed air supply is exchanged with a cooling fluid, and an expansion device for expanding and cooling the compressed air supply cooled in the secondary heat exchanger, mixing apparatus for mixing the expanded and cold supply air with recirculating air from the environment, a by-pass flow path for compressed cooled supply air from the secondary heat exchanger to the environment, and a secondary supply flow path for the hot pressurised air to the secondary heat exchanger, a first valve in a primary supply flow path to the primary heat exchanger, a second valve in the secondary supply flow path to the secondary heat exchanger, a third valve in a flow path for the compressed air supply to the secondary heat exchanger, a fourth valve in the flow path for cooled compressed supply air from the secondary heat exchanger, and a by-pass valve in the by-pass flow path for compressed cooled supply air from the secondary heat exchanger, a first air flow sensor for sensing air flow from the supply to the primary heat exchanger when the first valve is open, a second air flow sensor for sensing air flow from the secondary heat exchanger along the by-pass flow path when the by-pass valve is open, and a third air flow sensor for sensing air flow of the expanded and cold supply air towards the mixing apparatus, and a controller for controlling each of the valves and for receiving inputs from each of the flow sensors and in which there is provided a load heat exchanger in which heat in hot air from the recirculating environment air is exchanged to the cooled compressed air from the secondary heat exchanger before passing to the expansion device, wherein the method includes opening the first, third and by-pass valves, and closing each of the second and fourth valves, and sensing the air flow to the environment along the by-pass passage by the second air flow sensor.

* * * * *